United States Patent
Teng

(10) Patent No.: US 9,369,985 B2
(45) Date of Patent: Jun. 14, 2016

(54) METHOD FOR DETERMINING A POSITION OF A WIRELESS ACCESS POINT, SELF-MOVING WIRELESS ACCESS POINT, AND SELF-MOVING WIRELESS ACCESS POINT COMBINATION

(71) Applicants: Elitegroup Computer Systems (SIP) Co., Ltd., Suzhou, Jiangsu (CN); Elitegroup Computer Systems Co.,Ltd., Taipei (TW)

(72) Inventor: Chin-Lee Teng, Taipei (TW)

(73) Assignees: Elitegroup Computer Systems (SIP) Co., Ltd., Suzhou Industrial Park, Suzho, Jiangsu (CN); Elitegroup Computer Systems Co., Ltd., Neihu District, Taipei (TW)

( * ) Notice: Subject to any disclaimer, the term of this patent is extended or adjusted under 35 U.S.C. 154(b) by 163 days.

(21) Appl. No.: 14/277,003

(22) Filed: May 13, 2014

(65) Prior Publication Data

US 2015/0215892 A1 Jul. 30, 2015

(30) Foreign Application Priority Data

Jan. 29, 2014 (TW) .............................. 103103594 A

(51) Int. Cl.
| | |
|---|---|
| *H04W 24/00* | (2009.01) |
| *H04M 3/00* | (2006.01) |
| *H04W 4/00* | (2009.01) |
| *H04W 40/00* | (2009.01) |
| *H04W 64/00* | (2009.01) |
| *G01S 5/00* | (2006.01) |
| *G01S 5/02* | (2010.01) |
| *H04W 84/00* | (2009.01) |

(52) U.S. Cl.
CPC ............... *H04W 64/003* (2013.01); *G01S 5/00* (2013.01); *G01S 5/02* (2013.01); *G01S 5/0226* (2013.01); *H04W 84/005* (2013.01)

(58) Field of Classification Search
CPC ...... H04W 16/18; H04W 84/12; H04W 24/02
USPC ................ 455/418, 422.1, 426.1, 426.2, 446, 455/456.1, 456.3
See application file for complete search history.

(56) References Cited

U.S. PATENT DOCUMENTS

| | | | | |
|---|---|---|---|---|
| 8,713,196 | B1 * | 4/2014 | Gormley | ............... H04L 47/525 709/235 |
| 2004/0078151 | A1 * | 4/2004 | Aljadeff | .................... G01S 5/06 702/40 |
| 2006/0002326 | A1 * | 1/2006 | Vesuna | ................. H04W 16/18 370/328 |
| 2013/0072227 | A1 | 3/2013 | Morgan | |
| 2014/0273877 | A1 * | 9/2014 | Corson | ................. H04W 16/18 455/67.13 |

* cited by examiner

*Primary Examiner* — Dung Hong
(74) *Attorney, Agent, or Firm* — Winston Hsu; Scott Margo

(57) ABSTRACT

A method for determining a position of a wireless access point, a wireless access point, and a wireless access point combination are provided. The wireless access point and a plurality of electronic devices are disposed in a space. The wireless access point moves along a predetermined route. The wireless access point receives a plurality of wireless network signals of the plurality of electronic devices at a plurality of positions on the predetermined route. The wireless access point determines relative positions of the plurality of electronic devices in the space according to the plurality of wireless network signals of the plurality of electronic devices, and then determines a signal transmitting/receiving position of the wireless access point according to the relative positions of the plurality of electronic devices in the space.

10 Claims, 4 Drawing Sheets

METHOD FOR DETERMINING A POSITION OF A WIRELESS ACCESS POINT, SELF-MOVING WIRELESS ACCESS POINT, AND SELF-MOVING WIRELESS ACCESS POINT COMBINATION

CROSS-REFERENCE TO RELATED APPLICATIONS

This application claims priority to Taiwan Patent Application No. 103103594, filed Jan. 29, 2014 and included herein by reference in its entirety.

BACKGROUND OF THE INVENTION

1. Field of the Invention

The present invention relates to a method for determining a position of a wireless access point, a wireless access point and a wireless access point combination, and more specifically, to a method of determining a position of a wireless access point, a self-moving wireless access point, and a self-moving wireless access point combination capable of determining an optimal signal transmitting/receiving position according to user's requirement.

2. Description of the Prior Art

With a growing popularity of wireless network applications, users browsing the internet, making internet calls or sending files through a wireless network is becoming a trend. The electronic device may use a wireless access point (WAP) to link to the Internet for data transmission. However, area coverage of the wireless access point is limited. When there is only a single wireless access point arranged in a large area or a building, electronic devices located relatively far from the wireless access point may not be able to receive wireless network signal and are then disconnected from the network. In order to connect to the network through the wireless access point, the user needs to move the electronic device to a position near the wireless access point to receive the wireless network signal from the wireless access point. Therefore, the conventional wireless access point is inconvenient for the users.

SUMMARY OF THE INVENTION

The present invention provides a method for determining an optimal signal transmitting/receiving position of at least one wireless access point according to user's requirement and the at least one wireless access point. The at least one wireless access point and a plurality of electronic devices are disposed in a space. The method comprises the at least one wireless access point moving along a predetermined route, the at least one wireless access point receiving a plurality of wireless network signals from the plurality of electronic devices at a plurality of positions on the predetermined route, the at least one wireless access point determining a relative position of each of the plurality of electronic devices in the space according to the wireless network signals of each of the plurality of electronic devices, and the at least one wireless access point determining a signal transmitting/receiving position of the at least one wireless access point according to the relative position of each of the plurality of electronic devices.

The present invention further provides a wireless access point. The wireless access point comprises a mobile unit; a network unit disposed on the mobile unit, the network unit being configured to link to Internet; a wireless transceiver disposed on the mobile unit and electrically connected to the network unit, the wireless transceiver being configured to transmit and receive wireless network signals to and from a plurality of electronic devices according to a wireless communication protocol; and a processing unit disposed on the mobile unit and electrically connected to the network unit, the wireless transceiver and the mobile unit, the processing unit being configured to control the mobile unit to move along a predetermined route, control the wireless transceiver to receive a plurality of wireless network signals of the plurality of electronic devices at a plurality of positions on the predetermined route, determine a relative position of each of the plurality of electronic devices in a space according to the wireless network signals of each of the plurality of electronic devices, and determine a signal transmitting/receiving position of the wireless access point according to the relative position of each of the plurality of electronic devices. In other aspects, the processing unit further controls the mobile unit to move to the signal transmitting/receiving position.

The present invention further provides a wireless access point combination, comprising two aforementioned wireless access points, wherein the processing unit of each of the two wireless access points is configured to control the corresponding mobile unit to move along the predetermined route, control the corresponding wireless transceiver to receive the wireless network signals of each of the plurality of electronic devices at the plurality of positions on the predetermined route, determine the relative position of each of the plurality of electronic devices in a space according to the wireless network signals of each of the plurality of electronic devices, and determine the corresponding signal transmitting/receiving position of each of the two wireless access points according to the relative position of each of the plurality of electronic devices.

In comparison to the prior art, the method for determining a position of at least one wireless access point of the present invention determines a relative position of each of the plurality of electronic devices in the space, determines an optimal signal transmitting/receiving position according to the relative position of each of the plurality of electronic devices in the space and user's requirement, and moves the wireless access point to the signal transmitting/receiving position. Therefore, the user can have a good quality wireless network signal without moving the electronic devices closer to the wireless access point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
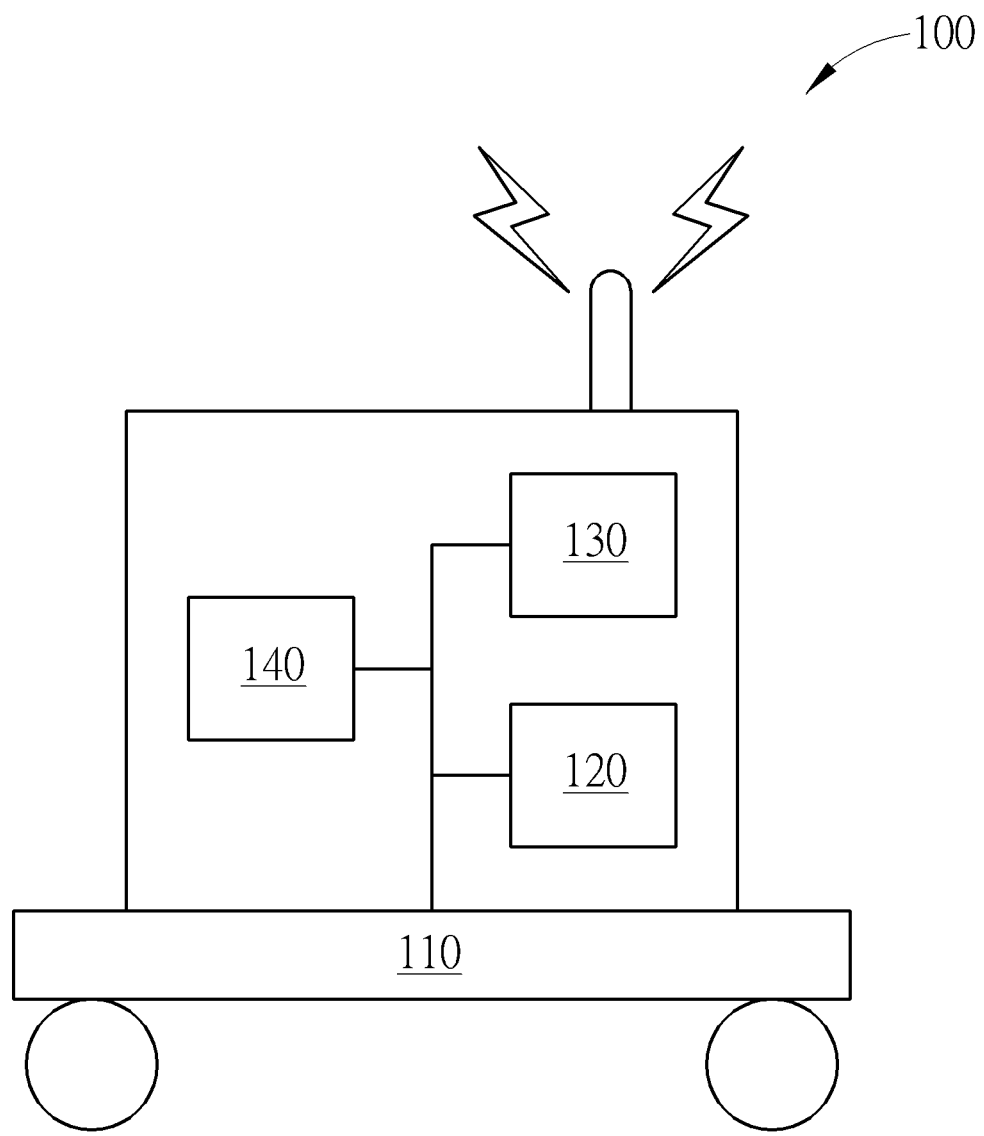
FIG. 1 is a diagram showing a wireless access point according to an embodiment of the present invention.

Please refer to FIG. 1. FIG. 1 is a diagram showing a wireless access point 100 according to an embodiment of the present invention. As shown in FIG. 1, the wireless access point 100 comprises a mobile unit 110, a network unit 120, a wireless transceiver 130 and a processing unit 140. The network unit 120 is disposed on the mobile unit 110 and configured to link to the Internet. The wireless transceiver 130 is disposed on the mobile unit 110 and electrically connected to the network unit 120. The wireless transceiver 130 is configured to transmit and receive wireless network signals to and from a plurality of electronic devices according to a wireless communication protocol. The processing unit 140 is disposed on the mobile unit 110 and electrically connected to the network unit 120, the wireless transceiver 130 and the mobile unit 110. The processing unit 140 is configured to control operations of the network unit 120, the wireless transceiver 130 and the mobile unit 110.

Figure 2:
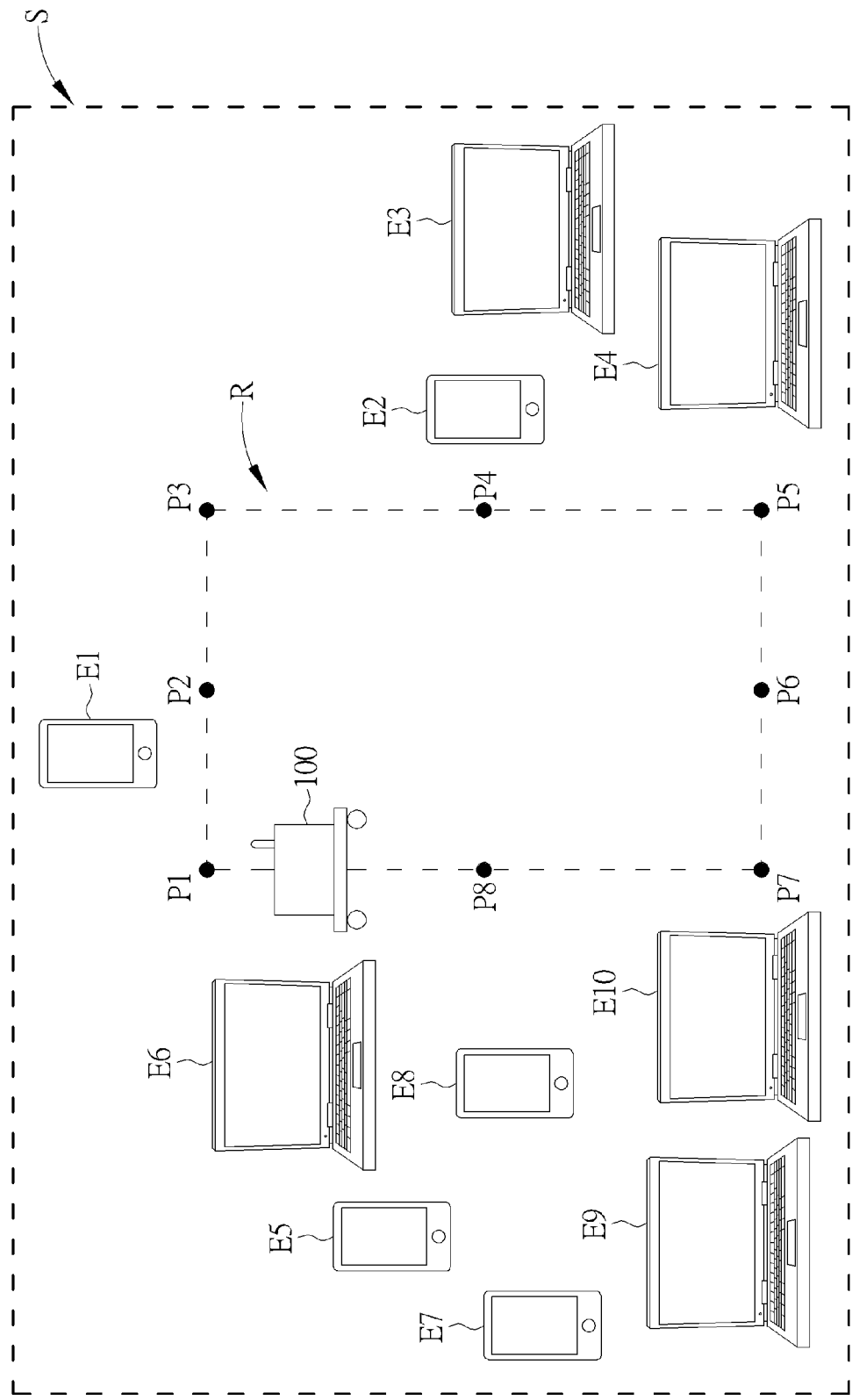
FIG. 2 is a diagram showing the wireless access point of the present invention determining a signal transmitting/receiving position.

Please refer to FIG. 2, and refer to FIG. 1 as well. FIG. 2 is a diagram showing the wireless access point of the present invention determining a signal transmitting/receiving position. As shown in figures, the processing unit 140 may control the mobile unit 110 to move along a predetermined route R. The predetermined route R may be a closed path or an open path. When the mobile unit 110 moves a first wireless access point 100 along the predetermined route R, the processing unit 140 may control the wireless transceiver 130 to receive a plurality of wireless network signals from a plurality of electronic devices E1-E10 at a plurality of positions P1-P8 on the predetermined route R. In other words, the wireless transceiver 130 may receive wireless network signals from each of the electronic devices E1-E10 at each of the plurality of positions P1-P8 on the predetermined route R. The signal strength of the wireless network signals may be inversely proportional to distances between the wireless transceiver 130 and the electronic devices E1-E10. According to the signal strength of the wireless network signals received by the wireless transceiver 130, the processing unit 140 may determine a relative position of each of the electronic devices E1-E10 in a space S. For example, when the wireless transceiver 130 receives a plurality of wireless network signals from an electronic device E1 at each of the plurality of positions P1-P8 on the predetermined route R, the processing unit 140 can determine a relative position of the electronic device E1 in the space S according to the signal strength of the plurality of wireless network signals of the electronic device E1 received by the wireless transceiver 130 from each of the plurality of positions P1-P8 on the predetermined route R and the coordinates of each of the plurality of positions P1-P8. Similarly, the processing unit 140 may use the same procedure to determine the relative positions of other remaining electronic devices E2-E10 in the space S. After the processing unit 140 determining the relative position of each of the plurality of electronic devices E1-E10 in the space S, the processing unit 140 can further determine a signal transmitting/receiving position according to user's requirement and the relative position of each of the plurality of electronic devices E1-E10 in the space S. In a preferred embodiment of the present invention, the processing unit 140 can control the mobile unit 110 to move to the signal transmitting/receiving position, after the signal transmitting/receiving position has been determined.

In an embodiment of the present invention, the processing unit 140 of the first wireless access point 100 may determine the signal transmitting/receiving position according to the relative position of each of the plurality of electronic devices E1-E10 in the space S and identification of each of the plurality of electronic devices E1-E10. For example, the wireless network signal from each of the plurality of electronic devices E1-E10 may comprise a corresponding identification. Therefore, the processing unit 140 of the first wireless access point 100 may identify the user of each of the plurality of electronic devices E1-E10. The identification of each of the plurality of electronic devices E1-E10 may correspond to a network usage priority. For example, the network usage priority may be set according to a job position level or a department of a user. When the identification of the electronic device E1 is set with a higher network usage priority (i.e. the user of the electronic device E1 has a highest job position level), the processing unit 140 of the first wireless access point 100 determines that the position P2 can be utilized as the signal transmitting/receiving position for the first wireless access point 100 to supply the best quality wireless network signal to the user of the electronic device E1, thus the processing unit 140 of the first wireless access point 100 can determine that the position P2 is the signal transmitting/receiving position, and control the mobile unit 110 to move to the position P2. And when the identifications of the electronic devices E2-E4 have a higher network usage priority (i.e. the department of the users of the electronic devices E2-E4 needs the Internet the most), the processing unit 140 determines that the position P4 can be utilized as the signal transmitting/receiving position for the first wireless access point 100 to supply the best quality wireless network signal to the users of the electronic devices E2-E4, thus the processing unit 140 of the first wireless access point 100 can determine that the position P4 is the signal transmitting/receiving position and control the mobile unit 110 to move to the position P4.

In an embodiment of the present invention, the processing unit 140 of the first wireless access point 100 can also determine the signal transmitting/receiving position according to the relative position of each of the plurality of electronic devices E1-E10 in the space S and the signal strength of the wireless network signals of the plurality of electronic devices E1-E10. For example, the processing unit 140 of the first wireless access point 100 may, according to signal strength of the wireless network signals of the plurality of electronic devices E1-E10 received by the wireless transceiver 130 at each of the positions P1-P8, determine a position in the space S, where signal strengths of all (or most) of wireless network signals of the plurality of electronic devices E1-E10 received the by the wireless transceiver 130 are greater than a predetermined value, as the signal transmitting/receiving position.

In an embodiment of the present invention, the processing unit 140 of the first wireless access point 100 also can determine the signal transmitting/receiving position according to the relative position of each of the plurality of electronic devices E1-E10 in the space S and a distribution status of the plurality of electronic devices E1-E10 in the space S. As shown in FIG. 2, the electronic devices E5-E10 are clustered in an area of the space S. Under such condition, the processing unit 140 may determine that the position P8 can be utilized as the signal transmitting/receiving position for the first wireless access point 100 to provide the best quality wireless network signals to most of the electronic devices, thus the processing unit 140 of the first wireless access point 100 can determine that the position P8 is the signal transmitting/receiving position and control the mobile unit 110 to move to the position P8 in order to provide most of the electronic devices with the best quality wireless network signals.

According to the above arrangement, the first wireless access point 100 of the present invention can automatically move to a signal transmitting/receiving position determined by the processing unit 140 for meeting user's requirement. Therefore, the user does not need to move the electronic device E1-E10 closer to the first wireless access point 100 which is causing usage inconvenience.

In addition, the processing unit 140 may update the signal transmitting/receiving position after a predetermined period of time, such that a new signal transmitting/receiving position can meet user's requirement better. More specifically, the processing unit 140, after a predetermined period of time, may re-control the mobile unit to move along the predetermined route R and re-control the wireless transceiver 130 to, again, receive wireless network signals from each of the plurality of electronic devices E1-E10 at each of the plurality of positions P1-P8 of the predetermined route R. And, the relative position of each of the plurality of electronic devices E1-E10 in the space S is determined according to a plurality of wireless network signals. A new signal transmitting/receiving position is then determined according to the relative position of each of the plurality of electronic devices E1-E10 in the space S.

Furthermore, when the wireless access point 100 is moved to the signal transmitting/receiving position, the processing unit 140 may control the wireless transceiver 130 to send a notification to any of the plurality of electronic devices E1-E10 that may receive a poor quality wireless network signal, for noticing the user of the electronic device receiving the poor quality wireless network signal moving to another position to receive a better quality wireless network signal.

On the other hand, in the above mentioned embodiments, the processing unit 140 is not limited to determining the signal transmitting/receiving position on the predetermined route R, and is not limited to determining the signal transmitting/receiving position at the positions P1-P8 of the predetermined route R. The processing unit 140 can determine the signal transmitting/receiving position to be at a position other than the predetermined route R. The signal transmitting/receiving position can be set at any position in the space S for providing the best quality wireless network signal to the users.

Furthermore, in the above mentioned embodiments, the predetermined route R is set on a two dimensional plane (i.e. floor or ceiling). Thus, the processing unit 140 may determine the relative position of the plurality of electronic devices E1-E10 on the two dimensional plane. In other embodiment of the present invention, the predetermined route R may be set in a three dimensional space, and the predetermined route R may have ups and downs (the mobile unit 110 may be able to adjust the height of the wireless transceiver 130). The processing unit 140 can then determine the relative position of the plurality of electronic devices E1-E10 in the three dimensional space. Also, the processing unit 140 may further adjust the height of the wireless transceiver 130 through controlling the mobile unit 110, in order to provide the best quality wireless network signal to the users.

To precisely determine the relative positions of the plurality of electronic devices E1-E10 in the space S, and expand the area coverage of service of the wireless network, the first wireless access point 100 of the present invention may communicate with other fixed or mobile wireless access points located in the space S. For example, the first wireless access point 100 may exchange signal strength information of the plurality of electronic devices E1-E10 with other fixed or mobile wireless access points located in the space S, such that the relative positions of the plurality of electronic devices E1-E10 in the space S can be determined more precisely and further improve on the determining of the signal transmitting/receiving position of the first wireless access point 100. And, thus, the first wireless access point 100 and other fixed or mobile wireless access points positioned within the space S may provide the best quality wireless network signal to the users.

Figure 3:
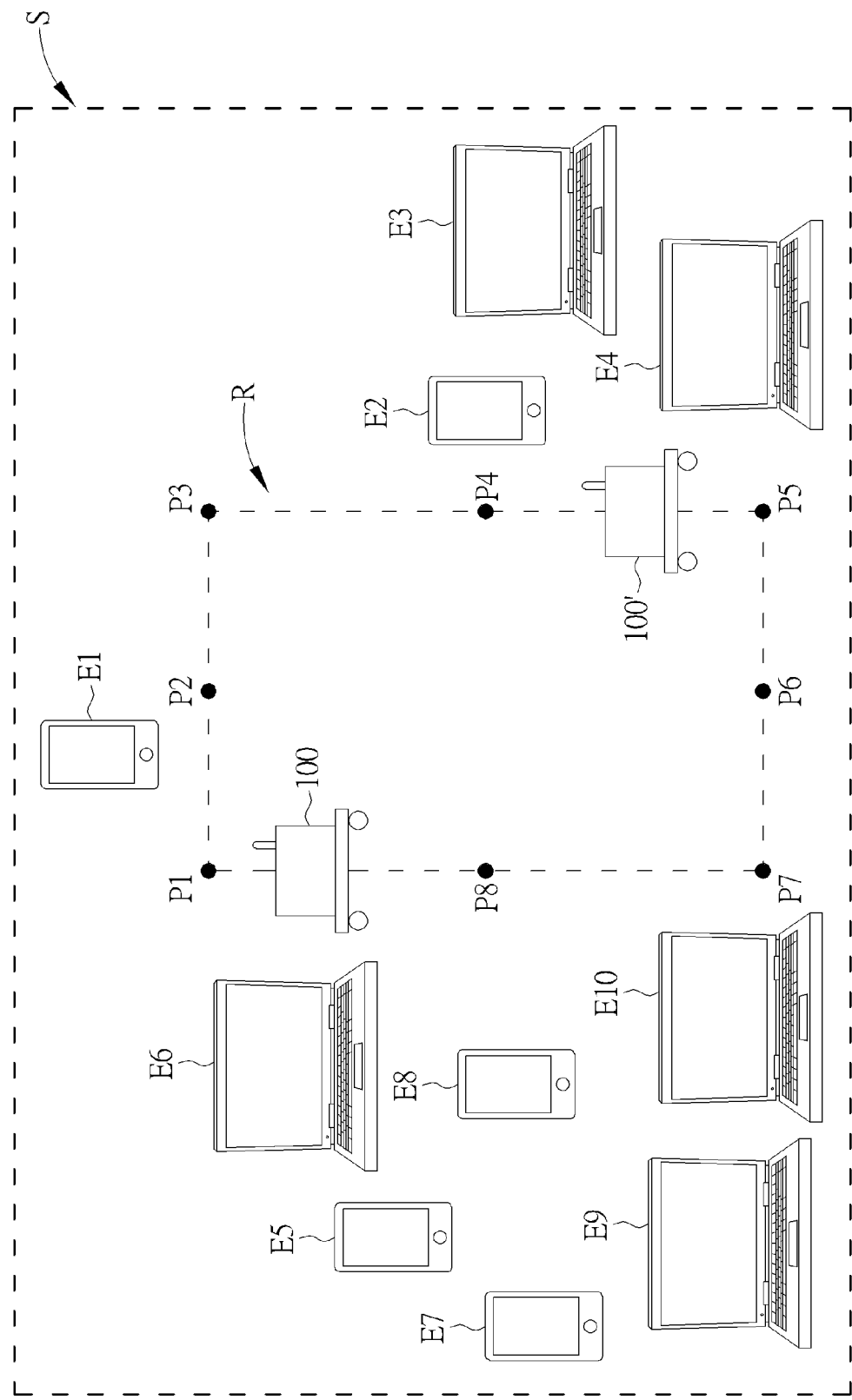
FIG. 3 is a diagram showing another embodiment for determining a signal transmitting/receiving position.

Please refer to FIG. 3. FIG. 3 is a diagram showing another embodiment for determining a signal transmitting/receiving position. As shown in FIG. 3, the present invention provides a wireless access point combination, comprising the first wireless access point 100 according to the above mentioned embodiments and a second wireless access point 100'. The second wireless access point 100' has the same structure as the first wireless access point 100 and will not be further discussed for brevity. The processing units of the first wireless access point 100 and the processing unit of the second wireless access point 100' control corresponding mobile units to move along the predetermined route R. In the present embodiment, the first wireless access point 100 and the second wireless access point 100' may both move along the predetermined route R, but in other embodiment, the first wireless access point 100 and the second wireless access point 100' may also move along two different predetermined routes. The processing units of the first wireless access point 100 and the second wireless access point 100' may control corresponding wireless transceivers to receive a plurality of wireless network signals from the plurality of electronic devices E1-E10 at the plurality of positions P1-P8 on the predetermined route R. The processing units of the first wireless access point 100 and the second wireless access point 100' may then determine the relative position of each of the plurality of electronic devices E1-E10 in the space S according to the plurality of wireless network signals received. The signal transmitting/receiving positions of the first wireless access point 100 and the second wireless access point 100' may be respectively determined according to the relative position of each of the plurality of electronic devices E1-E10 in the space S. When the processing units of the first wireless access point 100 and the second wireless access point 100' determine the relative position of each of the plurality of electronic devices E1-E10 in the space S, the wireless transceivers of the first wireless access point 100 and the second wireless access point 100' may exchange the wireless network signals of the plurality of electronic devices E1-E10 for more quickly and precisely determining the relative position of each of the plurality of electronic devices E1-E10 in the space S. In addition, when the processing units of the first wireless access point 100 and the second wireless access point 100' determine the corresponding signal transmitting/receiving positions of the first wireless access point 100 and the second wireless access point 100', the first wireless access point 100 and the second wireless access point 100' may exchange the relative position of each of the plurality of electronic devices E1-E10 in the space S determined by the corresponding processing units, for more quickly and precisely determining the corresponding signal transmitting/receiving positions of the first wireless access point 100 and the second wireless access point 100'.

Figure 4:
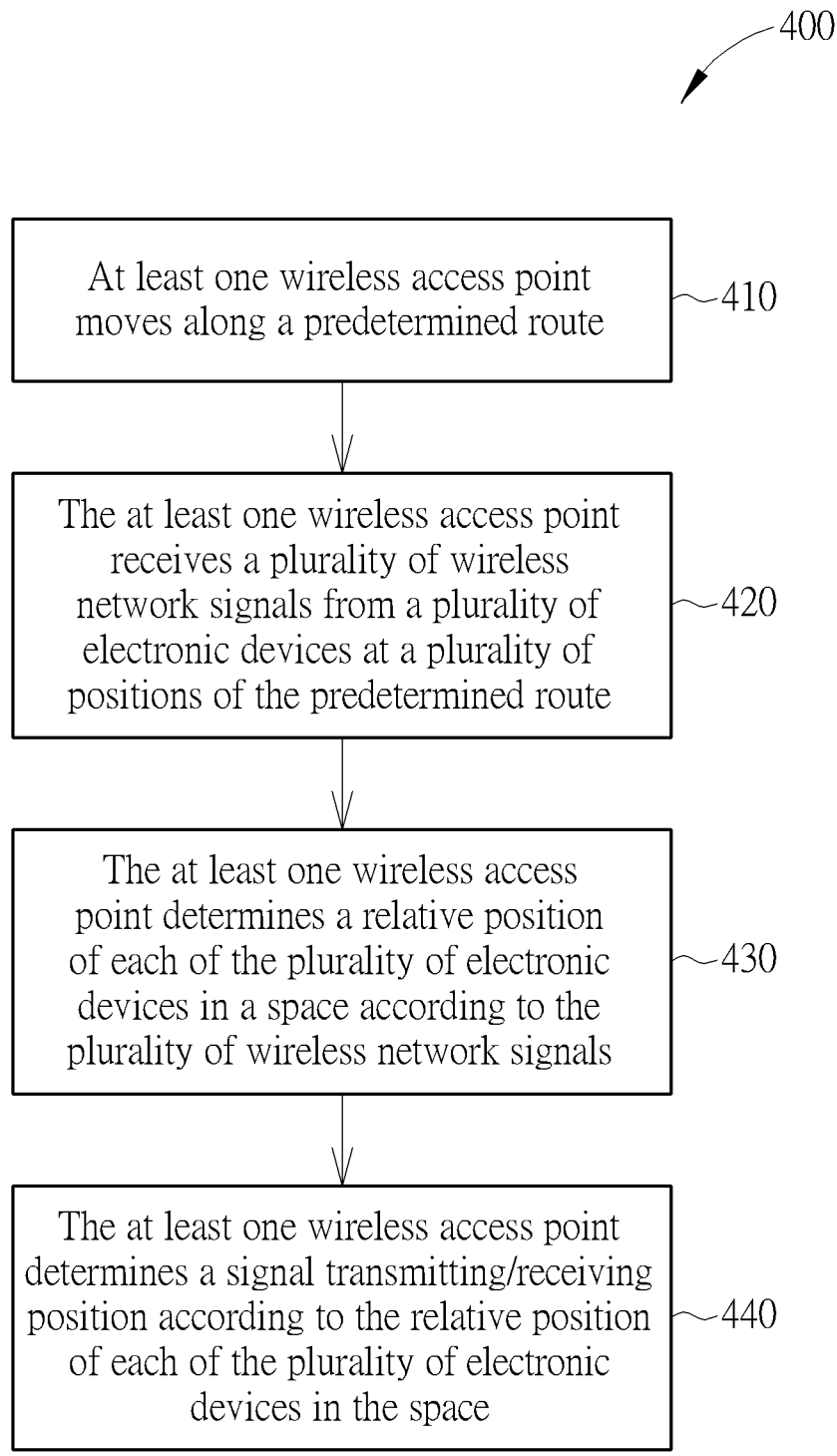
FIG. 4 is a flowchart showing a method of determining a signal transmitting/receiving position of a wireless access point according to an embodiment of the present invention.

Please refer to FIG. 4. FIG. 4 is a diagram showing a flowchart 400 of a method for determining a signal transmitting/receiving position of a wireless access point according to an embodiment of the present invention. The method for determining a signal transmitting/receiving position of a wireless access point comprises the following steps:

Step 410: At least one wireless access point moves along a predetermined route;

Step 420: The at least one wireless access point receives a plurality of wireless network signals from a plurality of electronic devices at a plurality of positions of the predetermined route;

Step 430: The at least one wireless access point determines a relative position of each of the plurality of electronic devices in a space according to the plurality of wireless network signals; and Step 440: The at least one wireless access point determines a signal transmitting/receiving position according to the relative position of each of the plurality of electronic devices in the space.

In contrast to the prior art, the method of the present invention can determine the relative position of each of the plurality of electronic devices in a space, and further determine an optimal signal transmitting/receiving position of the wireless access point according to the relative position of each of the plurality of electronic devices in the space and the user's requirement, so as to control the wireless access point to move to the signal transmitting/receiving position. Therefore, the users can obtain the best wireless network signal quality without moving the electronic devices closer to the wireless access point.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a position of at least one wireless access point, the at least one wireless access point and a plurality of electronic devices being disposed in a space, the method comprising:
   the at least one wireless access point moving along a predetermined route;
   the at least one wireless access point receiving a plurality of wireless network signals from the plurality of electronic devices at a plurality of positions on the predetermined route;
   the at least one wireless access point determining a relative position of each of the plurality of electronic devices in the space according to the wireless network signals of each of the plurality of electronic devices; and
   the at least one wireless access point determining a signal transmitting/receiving position of the at least one wireless access point according to the relative position of each of the plurality of electronic devices in the space and a network usage priority corresponding to an identification of each of the plurality of electronic devices to supply the best quality wireless network signal to users of the electronic devices having the highest priority.

2. The method of claim 1, further comprising:
   the at least one wireless access point automatically moving to the signal transmitting/receiving position.

3. The method of claim 1, wherein the at least one wireless access point determines the signal transmitting/receiving position according to the relative position of each of the plurality of electronic devices in the space, the network usage priority corresponding to the identification of each of the plurality of electronic devices, and signal strength of the wireless network signals of each of the plurality of electronic devices.

4. The method of claim 1, further comprising:
   the at least one wireless access point moving along the predetermined route after a predetermined period of time, receiving wireless network signals from each of the plurality of electronic devices at a plurality of positions on the predetermined route, determining the relative position of each of the plurality of electronic devices in the space according to the wireless network signals of each of the plurality of electronic devices, and determining a new signal transmitting/receiving position of the at least one wireless access point according to the relative position of each of the plurality of electronic devices and the network usage priority corresponding to the identification of each of the plurality of electronic devices to supply the best quality wireless network signal to users of the electronic devices having the highest priority.

5. The method of claim 1, wherein the at least one wireless access point comprises a first wireless access point and a second wireless access point, the method comprises:
   the first wireless access point and the second wireless access point moving along the predetermined route;
   the first wireless access point and the second wireless access point receiving the wireless network signals from each of the plurality of electronic devices at the plurality of positions on the predetermined route;
   the first wireless access point and the second wireless access point determining the relative position of each of the plurality of electronic devices in the space according to the wireless network signals of each of the plurality of electronic devices; and
   the first wireless access point and the second wireless access point determining a signal transmitting/receiving position of the first wireless access point and a signal transmitting/receiving position of the second wireless access point according to the relative position of each of the plurality of electronic devices and the network usage priority corresponding to the identification of each of the plurality of electronic devices to supply the best quality wireless network signal to users of the electronic devices having the highest priority.

6. A wireless access point, comprising:
   a mobile unit;
   a network unit disposed on the mobile unit, the network unit being configured to link to Internet;
   a wireless transceiver disposed on the mobile unit and electrically connected to the network unit, the wireless transceiver being configured to transmit and receive wireless network signals to and from a plurality of electronic devices according to a wireless communication protocol; and
   a processing unit disposed on the mobile unit and electrically connected to the network unit, the wireless transceiver and the mobile unit, the processing unit being configured to control the mobile unit to move along a predetermined route, control the wireless transceiver to receive a plurality of wireless network signals of the plurality of electronic devices at a plurality of positions on the predetermined route, determine a relative position of each of the plurality of electronic devices in a space according to the wireless network signals of each of the plurality of electronic devices, and determine a signal transmitting/receiving position of the wireless access point according to the relative position of each of the plurality of electronic devices and a network usage priority corresponding to an identification of each of the plurality of electronic devices to supply the best quality wireless network signal to users of the electronic devices having the highest priority.

7. The wireless access point of claim 6, wherein the processing unit is further configured to control the mobile unit to move to the signal transmitting/receiving position.

8. The wireless access point of claim 6, wherein the processing unit determines the signal transmitting/receiving position according to the relative position of each of the plurality of electronic devices in the space, the network usage priority corresponding to the identification of each of the plurality of electronic devices to supply the best quality wireless network signal to users of the electronic devices having the highest priority, and signal strength of the wireless network signals of each of the plurality of electronic devices.

9. The wireless access point of claim 6, wherein the processing unit is further configured to move the mobile unit along the predetermined route after a predetermined period of time, control the wireless transceiver to receive wireless network signals of each of the plurality of electronic devices at a plurality of positions on the predetermined route, determine a relative position of each of the plurality of electronic devices in a space according to the wireless network signals of each of the plurality of electronic devices, and determine a new signal transmitting/receiving position of the wireless access point according to the relative position of each of the plurality of electronic devices.

10. A wireless access point combination, comprising:
two wireless access points of claim 6, wherein the processing unit of each of the two wireless access points is configured to control the corresponding mobile unit to move along the predetermined route, control the corresponding wireless transceiver to receive the wireless network signals of each of the plurality of electronic devices at the plurality of positions on the predetermined route, determine the relative position of each of the plurality of electronic devices in a space according to the wireless network signals of each of the plurality of electronic devices, and determine the corresponding signal transmitting/receiving position of each of the two wireless access points according to the relative position of each of the plurality of electronic devices and the network usage priority corresponding to the identification of each of the plurality of electronic devices to supply the best quality wireless network signal to users of the electronic devices having the highest priority.

* * * * *